Patented Oct. 5, 1926.

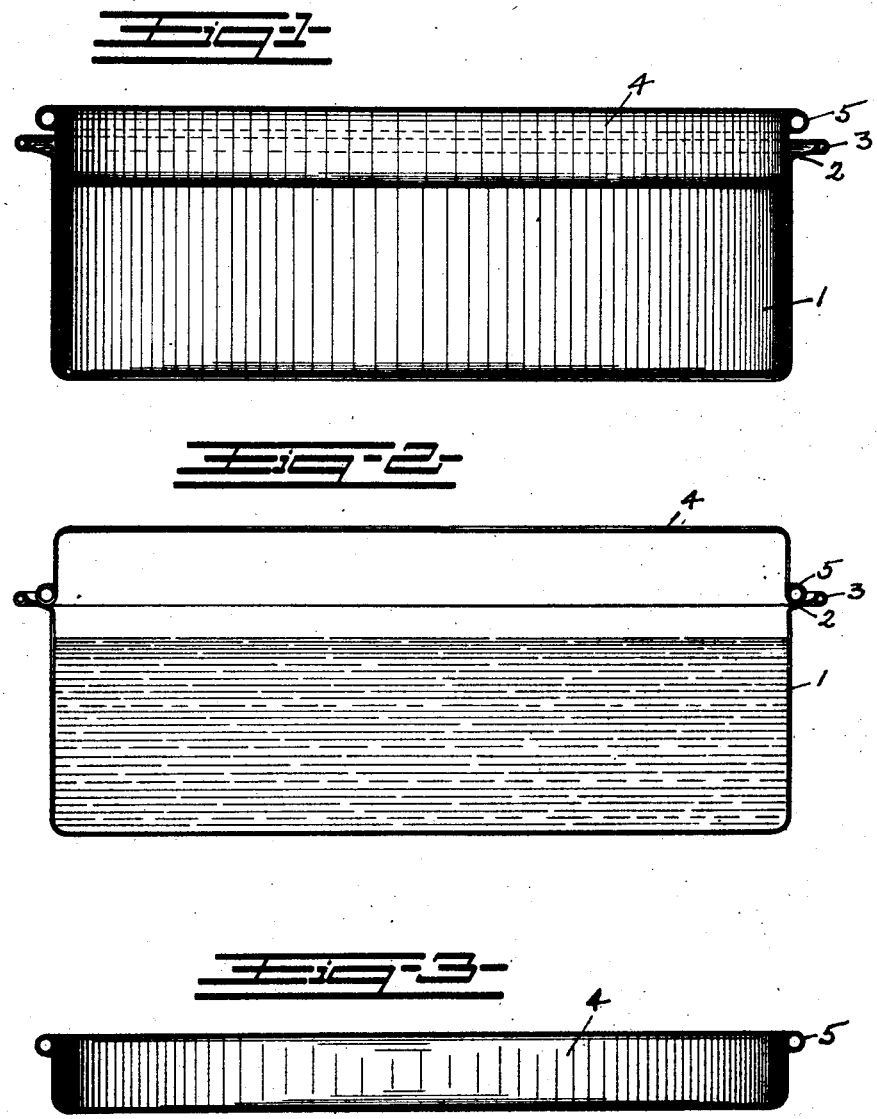

1,602,053

UNITED STATES PATENT OFFICE.

HERMAN STEINRUCK AND URBAN S. BOYLE, OF ERIE, PENNSYLVANIA; VERA E. STEINRUCK ADMINISTRATRIX OF THE ESTATE OF SAID HERMAN STEINRUCK, DECEASED.

COOKING RECEPTACLE.

Application filed December 3, 1923. Serial No. 678,191.

The object of this invention is to provide a pair of cooking utensils so formed that they may be used as a container packing such a commodity for example as coffee where it is desired to have the packing case practically air-tight. In this way the container in which such materials are sold may be saved in as much as the usual container is comparatively useless after serving as a packing case.

The invention is illustrated in the accompanying drawings as follows:—

Fig. 1 shows a central section through the receptacles assembled as a packing case.

Fig. 2 shows the receptacles used as a cooking receptacle, one receptacle acting as a cover for the other.

Fig. 3 a side elevation of the shallower of the cooking utensils used in the assembled packing case as the cover.

1 marks the main packing receptacle formed with the base and annular side walls. This has a flared or channeled edge forming a seat for a cover terminating in a roll 3. A cover or secondary cooking receptacle 4 has a base and annular side walls, the side walls forming a pressed fit with the side walls of the lower receptacle, thus making an air-tight container when the cover or upper receptacle is forced into the lower receptacle. The upper receptacle is brought down with pressure into the lower receptacle a sufficient distance to leave the chamber beneath such as to give the usual quantity as one or two pounds of the commodity being held in the container. In any event the fit of the upper receptacle is a tight or pressed fit requiring pressure to insert it.

After the assembled utensils have served their purpose as a container, or packing receptacle, they are taken apart by the consumer and the two receptacles are then adapted for the ordinary use as cooking utensils having the relation, however, that the shallower of these receptacles may be inverted as a cover for the deeper of the receptacles, the shallower utencil having a rolled edge 5 adapted to seat on the channel 2 within the rolled edge 3.

What we claim as new is:—

1. A cooking receptacle having a base and an annular and approximately cylindrical side wall with an out-turned cover receiving channel along its upper edge; and a cover having a base and an approximately cylindrical side wall, the side wall of the cover forming a pressed fit with the side wall of said receptacle, the cover being of substantially less depth than the receptacle leaving a container space in the receptacle with the cover in place and said cover being in the form of a cooking receptacle and having an outwardly extending edge adapted to seat with the cover reversed in the cover channel, the assembled receptacles being adapted to form a closed packing container or a cooking receptacle and its cover and when separated each to form a cooking receptacle.

2. A cooking receptacle having a base and an annular and approximately cylindrical side wall with an out-turned cover receiving channel along its upper edge bounded by a rolled edge; and a cover having a base and an annular and approximately cylindrical side wall, the side wall of the cover forming a pressed fit with the side wall of the receptacle, the cover being of substantially less depth than the receptacle leaving a container space in the receptacle with the cover in place and said cover being in the form of a cooking utensil having an outwardly extending rolled edge adapted to seat with the cover reversed in the cover channel of the receptacle, the assembled receptacle and cover being adapted to form a packing container or a cooking receptacle and its cover and separately each to form a separate cooking receptacle.

In testimony whereof we have hereunto set our hands.

HERMAN STEINRUCK.
URBAN S. BOYLE.